No. 862,467.
PATENTED AUG. 6, 1907.
E. V. R. GARDINER.
FLY PAPER.
APPLICATION FILED NOV. 17, 1906.
2 SHEETS—SHEET 1.
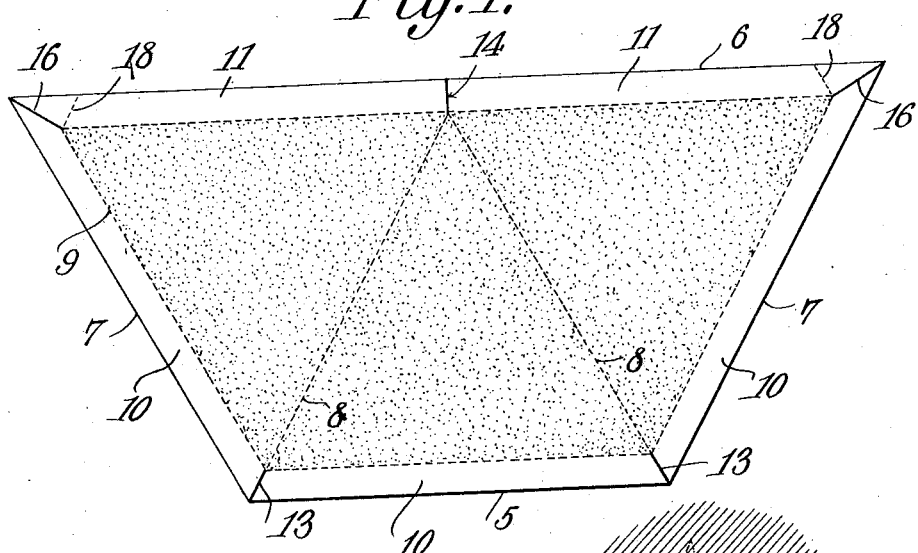
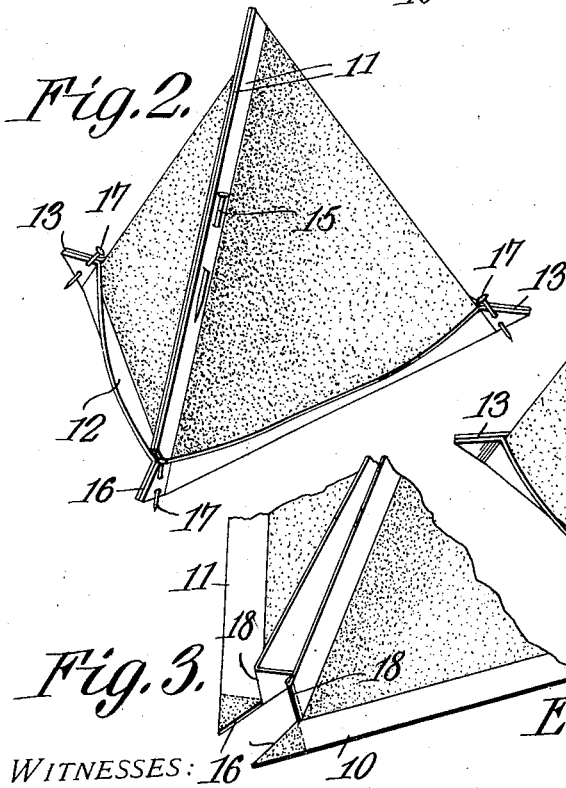
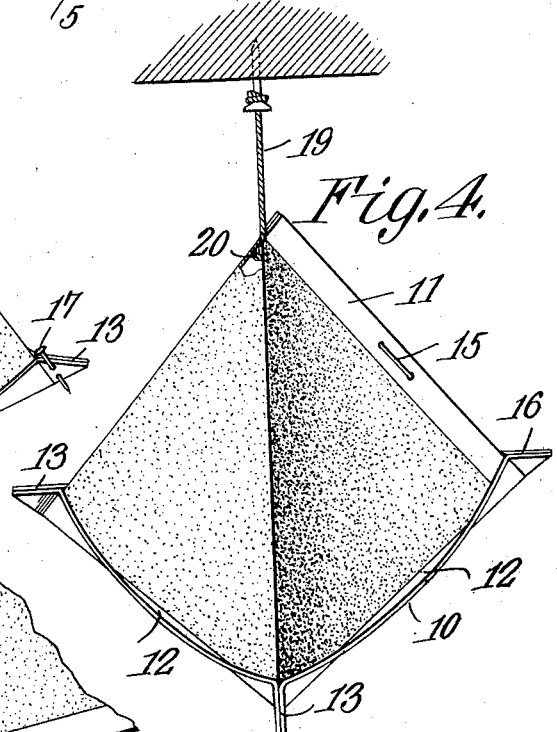
Emmet V. R. Gardiner,
INVENTOR.
WITNESSES:
By C. A. Snow & Co.
ATTORNEYS No. 862,467.
PATENTED AUG. 6, 1907.
E. V. R. GARDINER.
FLY PAPER.
APPLICATION FILED NOV. 17, 1906.
2 SHEETS—SHEET 2.
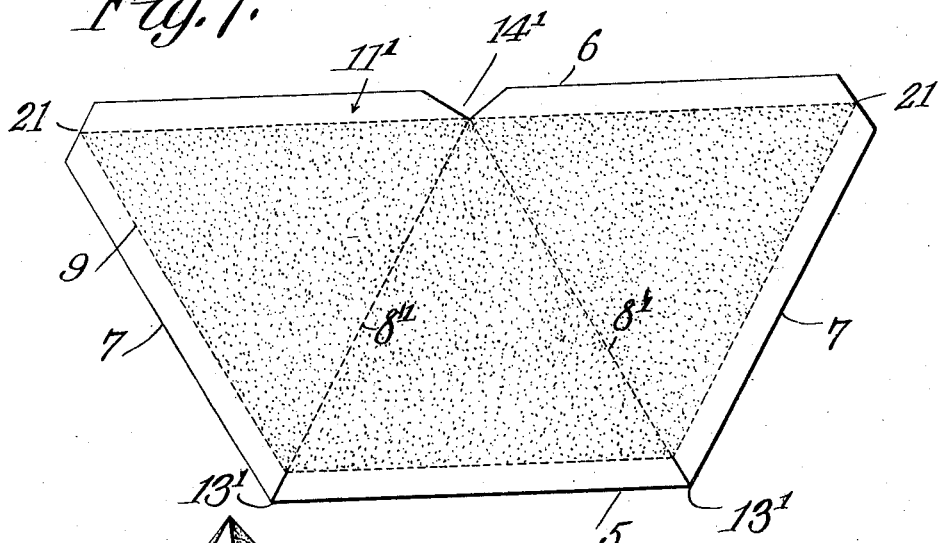
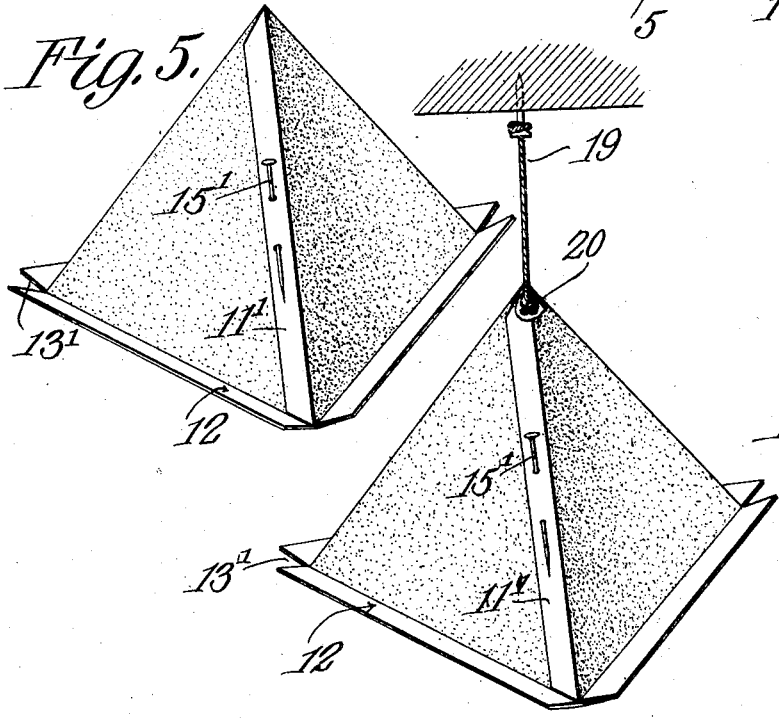
WITNESSES:
Emmet V. R. Gardiner, INVENTOR.
By C. A. Snow & Co.
ATTORNEYS

UNITED STATES PATENT OFFICE.

EMMET V. R. GARDINER, OF RIDGEBURY, NEW YORK.

FLY-PAPER.

No. 862,467.  Specification of Letters Patent.  Patented Aug. 6, 1907.

Application filed November 17, 1906. Serial No. 343,921.

*To all whom it may concern:*

Be it known that I, EMMET V. R. GARDINER, a citizen of the United States, residing at Ridgebury, in the county of Orange and State of New York, have invented a new and useful Fly-Paper, of which the following is a specification.

This invention relates to fly traps and has for its object to provide a comparatively simple and inexpensive device of this character for catching or trapping flies, gnats and other insects.

A further object of the invention is to provide a substantially tri-angular body portion capable of being suspended from the ceiling or supported on a table or the like and having its side walls saturated, coated, or otherwise covered with an adhesive material whereby flies, gnats and other insects alighting on said walls will be effectually trapped.

A further object is to provide a trap formed of a single paper blank having converging fold lines and provided with a marginal flap whereby when the blank is folded the flap will project laterally from the base of the body portion and thus constitute a trough for catching the drippings.

A still further object of the invention is to generally improve this class of devices so as to increase their utility, durability and efficiency as well as to reduce the cost of manufacture.

With these and other objects in view the invention consists in the construction and novel combination and arrangement of parts hereinafter fully described, and illustrated in the accompanying drawings, it being understood that various changes in form, proportions and minor details of construction may be resorted to within the scope of the appended claims.

In the accompanying drawings forming a part of this specification: Figure 1 is a plan view of the blank from which the trap is constructed. Fig. 2 is a perspective view showing the blank folded. Fig. 3 is a perspective view of a portion of the trap showing the manner of folding the blank. Fig. 4 is a similar view illustrating a slightly modified form of trap and showing the same suspended from a ceiling or other suitable support. Figs. 5 and 6 are perspective view illustrating further modifications, and Fig. 7 is a plan view of the blank forming the trap shown in Figs. 5 and 6.

Similar numerals of reference indicate corresponding parts in all of the figures of the drawings.

The improved trap is preferably constructed from a quadrilateral blank formed of paper, card-board, fabric or other suitable material and having its longitudinal edges 5 and 6 disposed parallel and its transverse edges or end walls 7 converging towards the lower longitudinal edge 5. The blank is provided with intermediate fold lines 8 which extend from the juncture of the transverse edges 7 and longitudinal edge 5 to the center of the opposite longitudinal edge 6, whereby when the blank is folded a substantially pyramidal body portion will be produced.

The paper or other material forming the blank is preferably saturated, coated or otherwise covered with a suitable adhesive material so that flies or other insects alighting on the side walls of the body portion will adhere thereto and thus be effectually trapped. The blank is provided with a continuous marginal fold line 9 defining a plurality of flaps 10 and 11, the flaps 10 being adapted to be folded laterally and upwardly to form laterally extending troughs 12 for catching the drippings, there being cuts or slits 13 formed in the flaps 9 and 10 at the juncture of the fold lines 8 so as to permit the flaps to be folded laterally. The flap 11 is provided with a slit 14 disposed at the apex of the converging fold-lines 8 so that when the blank is folded the two flaps thus formed may be extended laterally with respect to the body portion to permit the insertion of a pin or similar fastening device 15 for retaining the blank in folded position. The opposite corners of the blank at the juncture of the edges 6 and 7 are also preferably slit, as indicated at 16, so that the adjacent ends of the flaps 10 and 11 may be secured together by suitable fastening devices 17 to form the trough 12. The adhesive material preferably covers the blank between the fold lines 9 so that the trap may be readily moved from place to place either by grasping the trough 12 or by gripping the flap 11 without sticking or otherwise soiling the fingers.

In constructing the trap the severed portions of the flaps 11 are folded inwardly on the lines 18, after which the blank is folded laterally on the lines 8 and the adjacent edges of the flaps 11 brought together and fastened by piercing said flaps with the pin 15. The flaps 10 are then folded upwardly and laterally on the fold lines 9 and the adjacent cut portions 13 and 16 secured by the pins 17 so as to produce a marginal trough at the base of the trap.

The trap shown in Fig. 2 is designed to rest on a table, floor or other suitable support but when it is desired to suspend the trap from a ceiling or the like a cord or other flexible medium 19 is extended through the apex of the trap and is secured in any suitable manner to said ceiling, there being a knot 20 formed in the rope at the apex of the body portion whereby to prevent accidental displacement of said cord.

It will of course be understood that the traps may be made in different sizes and shapes and that the side walls of the traps may be partially or entirely covered with adhesive material. In this form of the trap the fastening devices 17 are dispensed with, the adjacent ends of the trough being glued or otherwise secured together or, if desired, pressed against the adhesive material covering the walls of the trap.

In Figs. 6 and 7 of the drawings the flap 11′ is provided with a V shaped notch or recess 14′ so that when the blank is folded on the lines 8′ the flaps 11, may over-lap to permit the insertion of the pin or fastening device 15′. In this form of the device the corners of the blank at the upper edge thereof are cut away at 21 while the severed or slit portions 13′ are spaced apart when the blank is folded, as shown.

From the foregoing description it will be seen that there is provided an extremely simple, inexpensive and efficient device admirably adapted for the attainment of the ends in view.

Having thus described the invention what is claimed is:

1. An insect trap formed of a quadrilateral blank provided with intermediate fold lines converging from one longitudinal edge of the blank to the center of the opposite longitudinal edge thereof, there being flaps extending on each side of the juncture of the converging fold lines and adapted to be brought together and united when the blank is folded, said blank being covered with an adhesive material.

2. An insect trap comprising a quadrilateral blank having a marginal flap on three sides thereof and provided with intermediate fold lines converging from one longitudinal edge of the blank towards the opposite edge thereof, there being a slit formed in one longitudinal edge of the blank at the juncture of the converging lines and defining oppositely disposed flanges adapted to be folded laterally and united when the blank is folded, said blank being covered with an adhesive material.

3. An insect trap formed of a quadrilateral blank provided with intermediate fold lines converging from one longitudinal edge of the blank towards the center of the opposite longitudinal edge thereof, there being slits formed in the corners of the blank and defining marginal flanges, the flanges at one longitudinal edge of the blank being adapted to be brought together and united when the blank is folded, and the remaining flanges bent laterally to form a marginal trough, said blank being covered with an adhesive material.

4. An insect trap comprising a hollow body portion having its exterior walls covered with an adhesive material and its lower edges bent laterally and upwardly to form a marginal trough, two of the side walls of the body portion being extended laterally beyond the adhesive material to form parallel longitudinal flanges, and a fastening device piercing said flanges.

In testimony that I claim the foregoing as my own, I have hereto affixed my signature in the presence of two witnesses.

EMMET V. R. GARDINER.

Witnesses:
HENRY W. WIGGINS,
CHARLES C. REDFIELD.